United States Patent [19]

Hendricks

[11] 4,145,074
[45] Mar. 20, 1979

[54] AUTOMOTIVE BODY HARNESS

[76] Inventor: Fred M. Hendricks, Rte. 2, Eastway Dr., Dallas, N.C. 28034

[21] Appl. No.: 803,627

[22] Filed: Jun. 6, 1977

[51] Int. Cl.² ............................................. B60R 21/10
[52] U.S. Cl. ................................. 280/744; 280/747; 297/274
[58] Field of Search ...................... 280/727, 744, 747; 297/389, 274; 128/75, 84 C, 94, 134

[56] References Cited

U.S. PATENT DOCUMENTS

| | | | |
|---|---|---|---|
| 1,332,328 | 3/1920 | Fisher | 297/389 |
| 2,898,976 | 8/1959 | Barecki | 280/747 |
| 2,998,008 | 8/1961 | Klesa | 297/389 |
| 3,167,068 | 1/1965 | Carr | 128/75 |
| 4,030,489 | 6/1977 | Buckner | 128/75 |

*Primary Examiner*—Robert R. Song
*Attorney, Agent, or Firm*—Wellington M. Manning, Jr.; Luke J. Wilburn, Jr.

[57] ABSTRACT

A body harness to be worn by a driver of an automotive vehicle with the harness being secured to a portion of the vehicle above a point to the rear of the driver's head to lift the body of the device slightly off the seat and thus relieve pressure on the lower end of the spine or tailbone that could normally result from extended sitting. The harness includes a girth encircling member or belt that is secureable around the body of the wearer. A pair of shoulder straps are secured to a medial portion of the belt, cross along the back of the wearer, and are secureable to buckles or the like on the front of the belt as worn. A vertical strap is secured to the shoulder straps at the crossing point of same and extends upwardly therefrom to be secureable at the top of the vehicle or the like and thus support the wearer, reducing pressure on the tailbone during use. The girth encircling member is of significant width and is padded on the inside and across the upper surface of same, at least at certain points, such that during wear the rib cage of the wearer is protected from pressures that could ordinarily be applied thereto.

13 Claims, 5 Drawing Figures

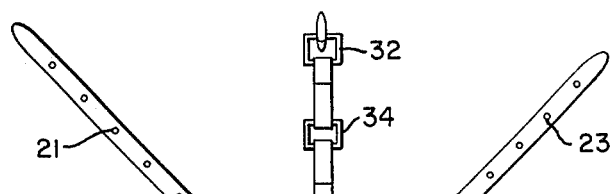
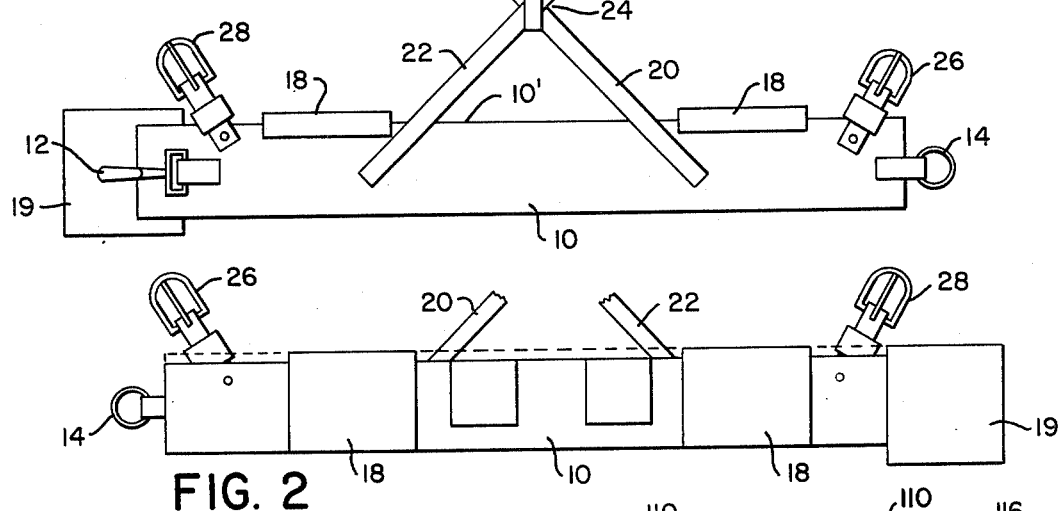
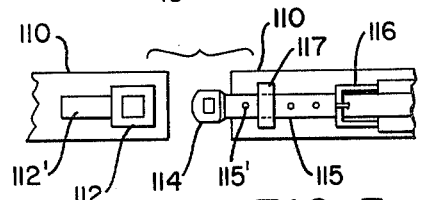
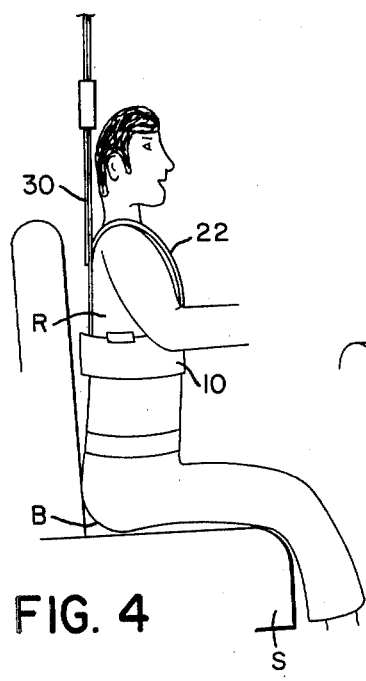
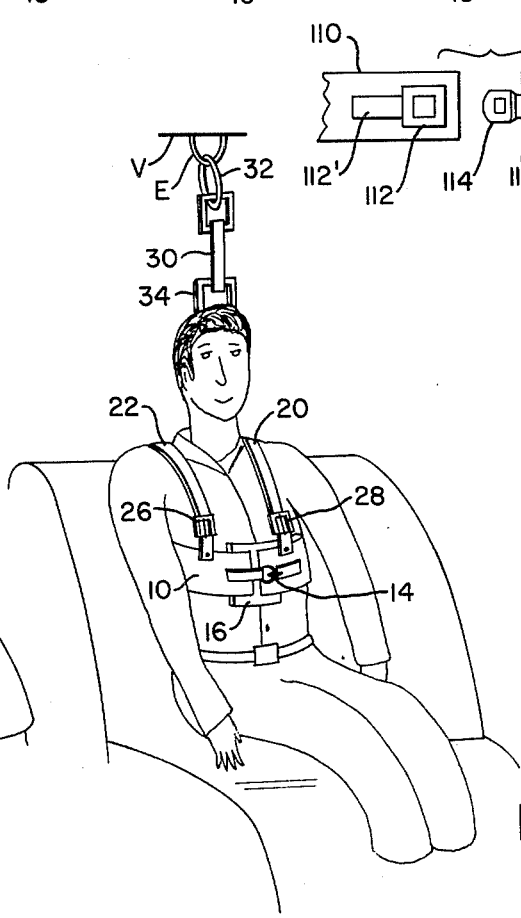

AUTOMOTIVE BODY HARNESS

BACKGROUND OF THE INVENTION

Various and sundry devices have heretofore been provided for improving the comfort of a driver of a vehicle, particularly those who experience long hours in vehicles such as truck drivers, bus drivers, and the like. Such devices have generally been directed to improvements to the seats for the most part, and, in fact, when employed in conjunction with normal safety belts, may defeat the purpose of the improvement. The body of the wearer would be held against the seat possibly adding to the pressure problem.

The present invention provides a body belt or body harness that is worn by a driver, with the body of the wearer being supported to relieve pressure on the tailbone by suspending the wearer slightly off the seat by the vertical strap secured to an upper portion of the vehicle. The present invention further provides a safety harness in much the same manner as a seat safety belt while permitting ample driver mobility to permit the driver to accomplish his intended driving functions in a substantially normal fashion.

SUMMARY OF THE INVENTION

It is an object of the present invention to provide a harness for wear by the driver of an automotive vehicle to relieve body pressures experienced during extended driving.

Another object of the present invention is to provide an improved safety harness for the driver of an automotive vehicle.

Still another object of the present invention is to provide a harness for wear by the driver of a vehicle which harness is connectable to a support in the roof of the vehicle to partially suspend the driver therefrom and thus relieve pressure exerted on the lower portion of the driver's spine.

Generally speaking, the present invention is directed to an improved harness assembly for use in automotive vehicles comprising a girth encircling member, said member having a substantial width dimension, said member further having a resilient, padded surface along at least a portion of the top of the member resideable below the arms of the wearer, said member having securing means at the ends thereof; a first shoulder strap secured to said girth encircling member and extending angularly outwardly therefrom; a second shoulder strap secured to said girth encircling member and extending angularly outwardly therefrom and crossing first said shoulder strap, a free end of said shoulder straps being securable to said girth encircling member; and a vertical support member secured to said shoulder straps at the point of intersection of same and extending upwardly therefrom, a free end of said vertical support member being securable to a portion of said automotive vehicle generally above the wearer.

More specifically, the improved belt or harness assembly according to the present invention, includes a wide girth encircling belt member possessing some rigidity as exemplified by a wide leather belt. The girth encircling member is covered on the inside portion of same that would contact the body of the wearer and along the top surface of same, at least along portions that could exert pressure against the body during wear, such as the rib cage area beneath the arms, and the area of the chest immediately beneath the point of securement of the belt around the body. Suitable resilient materials for covering the inside and top surface of the girth encircling member include, but are not limited to resilient foam, lamb's wool, and the like. The two shoulder straps are secured at one end to the rear of the girth encircling member as worn with the outer free ends of same extending angularly to and beyond a point of intersection. The free ends of the shoulder straps beyond the point of intersection, will thus extend over the shoulders of the wearer and down across the chest to a suitable securing means such as buckles, snaps, or the like, provided on the girth encircling member. A vertical strap is secured to the shoulder straps at the point of intersection and extends upwardly therefrom. The vertical strap has connection means thereon to permit the entire harness to be secured to a support member in the top of the vehicle and is capable of length adjustment.

BRIEF DESCRIPTION OF THE DRAWINGS

FIG. 1 is a plan outside view of an improved body harness according to the teachings of the present invention.

FIG. 2 is a partial plan inside view of a body harness according to the teachings of the present invention.

FIG. 3 is a partial plan view of a body harness according to the present invention showing a further embodiment of same.

FIGS. 4 and 5 are views of an occupant using a body harness according to the present invention.

DESCRIPTION OF THE PREFERRED EMBODIMENTS

Making reference to the Figures, preferred embodiments of the present invention will now be described in detail. The body harness according to the teachings of the present invention is designed to reside around the waist of the wearer and when secured to an upper portion of the automotive vehicle to ride upwardly around the rib cage and slightly lift the wearer to relieve pressure that may exist due to body weight on the lower spine or tailbone against the seat.

The body belt or harness according to the present invention includes a girth encircling member or belt 10, preferably a wide leather belt strap, though other materials may be employed that possess some degree of rigidity to permit the forces thereon to be distributed around the body of the wearer. Girth encircling member 10 is provided with securement means illustrated by hook 12 and an eyelet 14 at opposite ends of member 10. When the girth encircling member 10 is presented around the body of a wearer, hook 12 may engage eyelet 14 to secure member 10 in place. A padded or resilient member 18, such as foam, is secured along at least a portion of the inside body contact surface of girth encircling member 10 and at least a portion of the top surface of member 10 to pad the belt at least at points where a pressure force or abrasive motion may be imparted to the body of the wearer. Likewise, a resilient element 19 may be secured to the inside surface of girth encircling member 10, adjacent an end of same to afford padding beneath the belt securement means. As shown in phantom in FIG. 2, the resilient material 18 may extend further along the length of the girth encircling member 10 and, in fact, may cover the entire inside surface of same.

A pair of shoulder straps 20 and 22 are secured to a medial portion of girth encircling member 10 to reside adjacent the back of the wearer. Straps 20 and 22 extend angularly upwardly to a point of intersection, noted at 24, where they are secured together. The outer free ends of the shoulder straps then may extend over the shoulder of the wearer and down along the front of the wearer's body where they are securable to member 10 by buckles or other securement means 26 and 28. In the embodiment shown in FIG. 1, the shoulder straps 20 and 22 have a plurality of openings 21 and 23 respectively along the length of same to afford adjustability of the harness. A vertical support strap 30 is secured to shoulder straps 20 and 22 at the intersection point 24 and extends upwardly therefrom. Vertical support strap 30 has a securement means 32 at an upper end thereof and as illustrated in FIG. 1, may have a length adjustment buckle means or the like 34 intermediate the length of same to permit adjustability for an individual wearing same.

FIG. 3 illustrates a further embodiment of the present invention wherein a girth encircling member 110 has a quick release buckle 112 secured to one end of same by a suitable strap 112' or the like, and a connector element 114 secured to an opposite end of same with buckle 112 receiving connector 114 to secure belt 110 in place around the body of the wearer. Connector 114 is preferably secured to an elongated strap 115 which has a plurality of openings 115' therealong, and is securable to a buckle or the like 116 which is in turn secured to body encircling member 110. Whereas connector 114 is shown to be adjustable as to length, obviously quick release buckle 112 could be adapted for length adjustability as well as or in lieu thereof. Elongated strap 115 preferably passes under a loop structure 117 that is secured to member 110 to hold connector 114 against member 110 during use. A suitable type buckle arrangement 112 and 114 would be of the type presently found in automotive seat safety belts.

As illustrated in FIGS. 4 and 5, the body harness of the present invention may be placed around the waist of an individual with girth encircling member 10 residing adjacent the rib cage and with shoulder straps 20 and 22 passing over the shoulders of the individual and downwardly along the front of the body to a point where they are secured to buckles or the like 26 and 28 respectively. Vertical support strap 30 is shown in FIG. 5 as being secured to an eyelet E located in an upper portion V of the vehicle, such as the roof. An individual wearing the harness and being supported from the eyelet E by vertical support member 30, as shown in FIG. 4, resides in the body harness with the buttocks B being slightly raised from the seat. As such that pressure on the tailbone will be relieved.

In addition to providing a vertical support function for the body of the occupant, the body harness of the present invention likewise serves as a safety belt, in that, while forward movement of the body is permitted, the head and shoulders of the wearer will be held against contact with the windshield of the vehicle and against any heavy contact with the steering wheel at its normal location. Body movement necessary to perform the driving function is, however, not hampered. As such, the body harness of the present invention serves a dual function of supporting the wearer, and affording safety during use while not adversely impeding arm mobility necessary for operation of the vehicle.

Having described the present invention in detail, it is obvious that one skilled in the art will be able to make variations and modifications thereto without departing from the scope of the invention. Accordingly, the scope of the present invention should be determined only by the claims appended hereto.

What is claimed is:
1. An improved harness assembly for use in automotive vehicles comprising:
   a. a girth encircling member, said member having a substantial width dimension, said member further having a resilient surface along at least a portion of the inside and top surfaces of the member resideable below the arms of a wearer of same, said member having member coupling means at the ends and strap securement means adjacent the ends thereof;
   b. a first shoulder strap secured to said girth encircling member and extending angularly outwardly therefrom;
   c. a second shoulder strap secured to said girth encircling member and extending angularly outwardly therefrom and crossing said first shoulder strap and being secured thereat, a free end of said shoulder straps being securable to said girth encircling member at said strap securement means; and
   d. a vertical support member secured to said shoulder straps at the point of shoulder strap intersection and extending upwardly therefrom, a free end of said vertical support member being securable to a portion of said automotive vehicle generally above the wearer.

2. An improved harness assembly as defined in claim 1 wherein the girth encircling member has a resilient surface along the inside and top surfaces of same for a major portion of the length of same.

3. An improved harness assembly as defined in claim 1 wherein the resilient surface is an independent material secured to the girth encircling member.

4. An improved harness assembly as defined in claim 1 wherein the resilient surface is defined by a strip of foam.

5. An improved harness assembly as defined in claim 1 wherein the resilient surface is defined by a strip of lambs wool.

6. An improved harness assembly as defined in claim 1 wherein a resilient padding means is provided on the girth encircling member, said padding means being located behind the coupling means for same.

7. An improved harness assembly as defined in claim 1 wherein the vertical support member is adjustable in length.

8. An improved harness assembly as defined in claim 1 wherein the coupling means comprise a quick release buckle and coupling element.

9. An improved harness assembly for use in an automotive vehicle comprising:
   a. a wide girth encircling belt, said belt having coupling means located at opposite ends of same, said belt further having a resilient surface along at least a portion of the top of same, said belt further having a pair of securement means located thereon adjacent each end of same;
   b. a first shoulder strap secured at an end to a medial portion of said belt and extending outwardly therefrom above the top of the belt;
   c. a second shoulder strap secured at one end to a medial portion of said belt and extending outwardly therefrom above the top of the belt; said shoulder straps intersecting above said belt, free ends of said straps being connectable to said pair of securement means on said belt; and d. a vertical support strap secured to said straps at the point of intersection of same and extending upwardly therefrom, a free end of said vertical strap being securable to a portion of said vehicle generally above the wearer of the belt.

10. An improved harness assembly as defined in claim 9 wherein said resilient surface on the top of said belt is defined by a foam material.

11. An improved harness assembly as defined in claim 9 wherein the resilient surface on the top of said belt is defined by a strip of lambs wool.

12. An improved harness assembly as defined in claim 9 wherein the vertical support strap is adjustable in length.

13. In combination an automotive vehicle having a driver compartment, a seat located in said compartment for the driver of the vehicle, a support structure located generally above the rear of the seat and a harness assembly for the driver of the vehicle, said assembly comprising a girth encircling, wide belt, said belt having coupling means at opposite ends of same and a pair of securement means located between said coupling means, a pair of shoulder straps secured to said belt and secured to each other at a point of intersection above said belt, a free end of said straps being securable to said belt at said securement means, and a vertical support strap secured at an end to said shoulder straps at the point of intersection, a free end of said vertical support strap being securable to said vehicle support structure, whereby said assembly relieves pressure from the lower spine of the wearer.

* * * * *